US010305845B1

(12) United States Patent
Waagen et al.

(10) Patent No.: US 10,305,845 B1
(45) Date of Patent: May 28, 2019

(54) ACCURATE USER ALIGNMENT ACROSS ONLINE SOCIAL MEDIA PLATFORMS

(71) Applicant: HRL Laboratories, LLC, Malibu, CA (US)

(72) Inventors: Alex N. Waagen, Fairfield, CA (US); Jiejun Xu, Chino, CA (US); Tsai-Ching Lu, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 250 days.

(21) Appl. No.: 14/639,979

(22) Filed: Mar. 5, 2015

Related U.S. Application Data

(63) Continuation-in-part of application No. 14/210,265, filed on Mar. 13, 2014, now Pat. No. 9,794,358.

(60) Provisional application No. 61/948,290, filed on Mar. 5, 2014, provisional application No. 61/809,160, filed on Apr. 5, 2013.

(51) Int. Cl.
 *H04L 12/58* (2006.01)
 *H04L 29/08* (2006.01)
 *H04L 29/12* (2006.01)

(52) U.S. Cl.
 CPC .......... *H04L 51/32* (2013.01); *H04L 61/609* (2013.01); *H04L 67/22* (2013.01)

(58) Field of Classification Search
 CPC .. H04L 41/0879; H04L 41/32; H04L 43/0817
 See application file for complete search history.

(56) References Cited

U.S. PATENT DOCUMENTS 8,131,685 B1* 3/2012 Gedalius ............. G06Q 10/107
 707/662
9,098,819 B1* 8/2015 Korula ............... G06Q 10/0635
 (Continued)

OTHER PUBLICATIONS

Cheng, Z.; Caverlee, J.; and Lee, K. (2010) "You are where you tweet: a content-based approach to geo-locating twitter users." In Proceedings of the 19th ACM international conference on Information and knowledge management, pp. 759-768. ACM.
(Continued)

*Primary Examiner* — Oleg Survillo
*Assistant Examiner* — Christopher P Cadorna
(74) *Attorney, Agent, or Firm* — Tope-McKay & Associates (57) ABSTRACT

Described is system for accurate user alignment across multiple online social media platforms. Out of textual messages from multiple user accounts of a first social media platform, the system identifies a set of textual messages from a first user account and a second user account of the first social media platform, each textual message in the set of textual messages comprising a set of specific character strings. The set of specific character strings represents a link to a post on a second social media platform, resulting in linked messages, the post originating from a linked account of the second social media platform. Either the first user account or the second user account is selected as an associated account by determining which originated the greater number of messages in the set of textual messages. A map component associated with a user identity that includes the associated account and the linked account is generated.

16 Claims, 10 Drawing Sheets

(56) References Cited

U.S. PATENT DOCUMENTS

| | | | |
|---|---|---|---|
| 2011/0125826 A1 | 5/2011 | Erhart et al. | |
| 2011/0145064 A1* | 6/2011 | Anderson | G06Q 30/02 705/14.53 |
| 2012/0036080 A1* | 2/2012 | Singer | G06Q 50/01 705/319 |
| 2012/0330721 A1 | 12/2012 | Volpe et al. | |
| 2013/0041860 A1 | 2/2013 | Lawrence | |
| 2013/0073336 A1 | 3/2013 | Heath | |
| 2013/0218965 A1 | 8/2013 | Abrol | |
| 2013/0346841 A1* | 12/2013 | Ahmed | H04L 67/22 715/208 |
| 2014/0052539 A1* | 2/2014 | Lauback | G06Q 30/0255 705/14.66 |
| 2014/0258197 A1 | 9/2014 | Davulcu | |
| 2015/0142767 A1* | 5/2015 | Wu | G06F 17/30864 707/706 |
| 2015/0172393 A1* | 6/2015 | Oplinger | H04L 67/18 709/204 |

OTHER PUBLICATIONS

Davis Jr. C.; Pappa, G.; de Oliveira, D.; and de L Arcanjo, F. (2011) "Inferring the location of twitter messages based on user relationships." Transactions in GIS 15(6): pp. 735-751.

Goldenberg, J., and Levy, M. (2009) "Distance is not dead: Social interaction and geographical distance in the internet era." arXiv preprint arXiv:0906.3202, pp. 1-22.

Hecht, B.; Hong, L.; Suh, B.; and Chi, E. (2011) "Tweets from justin bieber's heart: the dynamics of the location field in user profiles." In Proceedings of the 2011 annual conference on Human factors in computing systems, pp. 237-246. ACM.

Ikawa, Y.; Enoki, M.; and Tatsubori, M. (2012) "Location inference using microblog messages." In Proceedings of the 21st international conference companion on World Wide Web, pp. 687-690. ACM.

Mahmud, J.; Nichols, J.; and Drews, C. (2012) "Where is this tweet from? inferring home locations of twitter users." Proc AAAI ICWSM 12, pp. 511-514.

Mok, D.; Wellman. B.; and Carrasco, J. (2010) "Does distance matter in the age of the internet?" Urban Studies 47(13): pp. 2747-2783.

Pontes, T.; Vasconcelos, M.; Almeida, J.; Kumaraguru, P.; and Almeida, V.(2012) "We know where you live: Privacy characterization of foursquare behavior," In UbiComp '12, pp. 898-905.

Sadilek, A.; Kautz, H.; and Bigham, J. (2012) "Finding your friends and following them to where you are." In Proceedings of the fifth ACM international conference on Web search and data mining, pp. 723-732. ACM.

Zhu, Xiaojin, and Zoubin Ghahramani. "Learning from labeled and unlabeled data with label propagation." Technical Report CMU-CALD-02-107, Carnegie Mellon University, (2002), pp. 1-17.

Vincenty, Thaddeus. Direct and inverse solutions of geodesics on the ellipsoid with application of nested equations. Survey review 23.176 (1975): pp. 88-93.

Ronkainen, Oja, and Orponen. (2003). Computation of the multivariate Oja median. Developments in Robust Statistics, pp. 344-359. http://users.ics.aalto.fi/orponen/papers/ojamed.pdf.

Vardi and Zhang. (2000). The multivariate L1-median and associated data depth. Proceedings of the National Academy of Sciences. 97(4): pp. 1423-1426. http://www.pnas.org/content/97/4/1423.full.pdf.

PCT International Search Report and the Written Opinion of the International Searching Authority for PCT/US2014/026846, dated Jul. 14, 2014, pp. 1-9.

S.V. Buldyrev, R. Parshani, G. Paul, H.E. Stanley, S. Havlin, "Catastrophic Cascade of Failures in Interdependent Systems," Nature 464, 08932 (2010), pp. 1025-1028.

M. Kurant, P. Thiran., "Layered complex networks," Phys. Rev. Lett. 96, (2006), pp. 138701-1-138701-4.

A.K. Elmagarmid, P.G. Ipeirolis, V.S. Verykios, "Duplicate Record Detection: A Survey", IEEE Trans on Knowledge and Data Engineering, (2007), pp. 1-16.

A. Marcus, E. Wu, D. karger, S. Madden, R. Miller, "Human-powered sorts and joints", VLDB 2012, pp. 13-24.

G. Andersson, "Causes of the 2003 major grid blackouts in North America and Europe, and recommended means to improve system dynamic performance," IEEE Trans. Power Syst., vol. 20, No. 4, pp. 1922-1928, Nov. 2005.

J.C. Laprie, K. Kanoun, M. Kaniche, "Modeling interdependencies between the electricity and information infrastructures," SAFECOMP-2007 4680, pp. 54-67.

M. Newman. Spread of epidemic disease on networks. Phys. Rev. E66, 016128 (2002), pp. 016128-1-016128-11.

J. Watts, "A simple model of global cascades on random networks," PNAS Apr. 30, 2002, vol. 99, No. 9, pp. 5766-5771.

S. Son, G. Bizhani, C. Christensen, P. Grassberger, M. Paczusk, "Percolation theory on interdependent networks based on epidemic spreading," EPL vol. 97 No. 1, 2012, pp. 16006-p1-16006-p6.

D. Jurgens, "That's what friends are for: inferring location in online communities based on social relationships," ICWSM 2013, pp. 273-282.

Jiejun Xu, Tsai-Ching Lu, Ryan Compton, David Allen, "Quantifying Cross-platform Engagement through Large-scale User Alignment," Proceedings of the 2014 ACM conference on Web science, pp. 281-282.

Office Action 1 for U.S. Appl. No. 14/210,265, dated Mar. 31, 2016.

Lars Backstrom et al., Find Me If You Can: Improving Geographical Prediction with Social and Spatial Proximity, Apr. 26-30, 2010, World Wide Web Conference Committee, 2010, p. 66.

Clodoveu Davis Jr et al., Inferring the Location of Twitter Messages Based on User Relationships, Nov. 22, 2011, Transactions in GIS, 15, p. 741-744.

Response to Office Action 1 for U.S. Appl. No. 14/210,265, dated Jun. 30, 2016.

Office Action 2 for U.S. Appl. No. 14/210,265, dated Oct. 21, 2016.

Response to Office Action 2 for U.S. Appl. No. 14/210,265, dated Jan. 23, 2017.

Notice of Allowance for U.S. Appl. No. 14/210,265, dated Jun. 8, 2017.

Communication regarding European Search Report and the European Search Opinion for European Regional Phase Patent Application No. 14780262.3, dated Oct. 13, 2016.

Search strategy in the European Search for European Regional Phase Patent Application No. 14780262.3, dated Oct. 13, 2016.

Search Report in the European Search for European Regional Phase Patent Application No. 14780262.3, dated Oct. 13, 2016.

Search Opinion for European Regional Phase Patent Application No. 14780262.3, dated Oct. 13, 2016.

Lars Backstrom et al: "Find me if you can," Proceedings of the 19th International Conference on World Wide Web. WWW '10. Jan. 1, 2010 (Jan. 1, 2010). XP055188728. New York. New York. USA, pp. 61-69.

Tatiana Pontes et al: "Beware of What You Share: Inferring Home Location in Social Networks." Data Mining Workshops (ICDMW). 2012 IEEE 12th International Conference On. IEEE. Dec. 10, 2012 (Dec. 10, 2012). pp. 571-578. XP032303104.

Clodoveu A. Davis Jr. et al: "Inferring the Location of Twitter Messages Based on User Relationships." Transactions in Gis. vol. 15. No. 6. Dec. 22, 2011 (Dec. 22, 2011). pp. 735-751. XP055305589. GB.

David Jurgens: "That' s What Friends are For: Inferring Location in Online Social Media Platforms Based on Social Relationships," Jun. 27, 2013 (Jun. 27, 2013). pp. 273-282. XP055307355. Retrieved from the Internet: URL:http://www.aaai.orgjocsjindex.php/ICWSM/ICWSM13/paperjviewFile/6067/6366 [retrieved on Oct. 4, 2016].

Office Action 1 for Chinese Application No. 201480020049.1, dated May 12, 2017.

Notice of Allowance for Chinese Application No. 201480020049.1, dated Oct. 30, 2017.

(56) References Cited

OTHER PUBLICATIONS

Response to the European Search Report for European Regional Phase Patent Application No. 14780262.3, dated Aug. 29, 2017.

* cited by examiner

ACCURATE USER ALIGNMENT ACROSS ONLINE SOCIAL MEDIA PLATFORMS

CROSS-REFERENCE TO RELATED APPLICATIONS

This is a Continuation-in-Part application of U.S. Non-Provisional application Ser. No. 14/210,265, filed in the United States on Mar. 13, 2014, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis."

This is also a Non-Provisional patent application of U.S. Provisional Application No. 61/948,290, filed in the United States on Mar. 5, 2014, entitled, "Accurate User Alignment Across Online Social Media Platforms."

FIELD OF INVENTION

The present invention relates to a system for aligning user accounts across online social media platforms and, more particularly, to a system for aligning user accounts across online social media platforms to track activity which flows across the social media platforms.

BACKGROUND OF THE INVENTION

Currently, it is only possible to analyze the flow of activity on individual online social networks, although a single user tends to have accounts in several different online social networks. As a result, an event in one network may have consequences in others, so that the view of larger systems which incorporate many different networks is important. Finding links between these networks would allow one to track activity which flows across the networks, which is not possible with existing methods.

There is a traditional database problem of "entity resolution" in computer science in which the goal is to identify whether two records refer to the same real-world entity. Researchers in the area of entity resolution have devised multiple techniques to correlate two records on multiple grounds, to remove duplicates, as well as aggregate more data of an entity present across databases (see the List of Incorporated Literature References, Literature Reference Nos. 3 and 4). In these references, database records are created and maintained by administrators in a centralized fashion. However, in online social networks, contents and attributes are fully created and maintained by the users themselves. In this case, the accuracy and trustworthiness of the user contents becomes a major factor to be taken into consideration.

Thus, a continuing need exists for a system for aligning user accounts across several online social media platforms to track activity which flows across the social media platforms.

SUMMARY OF THE INVENTION

The present invention relates to system for aligning user accounts across online social media platforms and, more particularly, to a system for aligning user accounts across online social media platforms to track activity which flows across the social media platforms. The system comprises one or more processors and a memory having instructions such that when the instructions are executed, the one or more processors perform multiple operations. Out of a plurality of textual messages from multiple user accounts of a first social media platform, the system identifies a set of textual messages in the plurality of textual messages from a first user account and a second user account of the first social media platform, each textual message in the set of textual messages comprising: a set of specific character strings, wherein the set of specific character strings represents a link to a post on a second social media platform, resulting in linked messages, the post originating from a linked account of the second social media platform. The system then selects either the first user account or the second user account as an associated account by determining which originated the greater number of messages in the set of textual messages. Finally, a map component associated with a user identity that includes the associated account and the linked account is generated.

In another aspect, the set of specific character strings is a unique uniform resource locator.

In another aspect, the system assigns geo-information from the linked messages to the map component.

In another aspect, geo-information is propagated from the first social media platform to the second social media platform.

In another aspect, user interest information is propagated from the first social media platform to the second social media platform.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for aligning user accounts across online social media platforms and, more particularly, to a system for aligning user accounts across online social media platforms to track activity which flows across the social media platforms. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited and incorporated literature references as used in the description is provided. Next, a description of various principal aspects of the present invention is provided. Following that is an introduction that provides an overview of the present invention. Finally, specific details of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. S. V. Buldyrev, R. Parshani, G. Paul, H. E. Stanley, S. Havlin, Catastrophic Cascade of Failures in Interdependent Systems, Nature 464, 08932 (2010).
2. M. Kurant, P. Thiran. Layered complex networks. Phys. Rev. Lett. 96, 138701 (2006).
3. A. K. Elmagarmid, P. G. Ipeirotis, V. S. Verykios, "Duplicate Record Detection: A Survey", IEEE Trans on Knowledge and Data Engineering, (2007).
4. A. Marcus, E. Wu, D. Karger, S. Madden, R. Miller, "Human-powered sorts and joints", VLDB, (2012).
5. G. Andersson, "Causes of the 2003 major grid blackouts in North America and Europe, and recommended means to improve system dynamic performance," IEEE Trans. Power Syst., vol. 20, no. 4, pp. 1922-1928, (2005).
6. J. C. Laprie, K. Kanoun, M. Kaniche. Modeling interdependencies between the electricity and information infrastructures. SAFECOMP-2007 4680, 54-67, (2007).
7. M. Newman. Spread of epidemic disease on networks. Phys. Rev. E66, 016128, (2002).
8. J. Watts. A simple model of global cascades on random networks. PNAS April 30, vol. 99 no. 95766-5771, (2002).
9. S. Son, G. Bizhani, C. Christensen, P. Grassberger, M. Paczusk. Percolation theory on interdependent networks based on epidemic spreading. EPL vol. 97 No. 1, (2012).
10. D. Jurgens. That's what friends are for: inferring location in online communities based on social relationships. ICWSM, (2013).
11. Ruslan Mitkov (2003). The Oxford Handbook of Computational Linguistics. Oxford University Press. p. 754. ISBN 978-0-19-927634-9.

(2) PRINCIPAL ASPECTS

The present invention has three "principal" aspects. The first is a system for accurate user alignment across online social media platforms. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
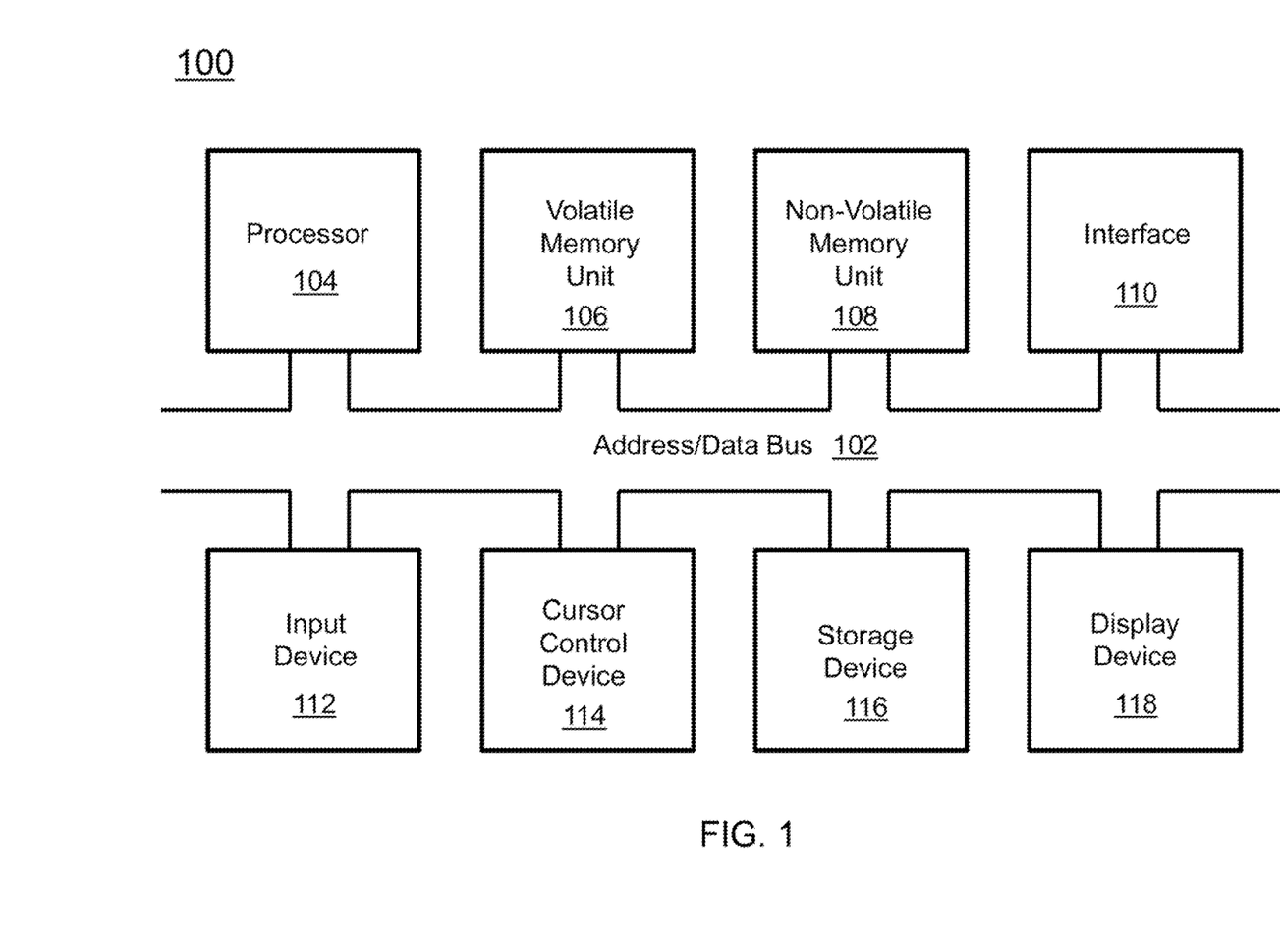
FIG. 1 is a block diagram depicting the components of a system for accurate user alignment across online social media platforms according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as the user interface, a camera and/or radar, or any combination of devices that provide the functionalities as described herein. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
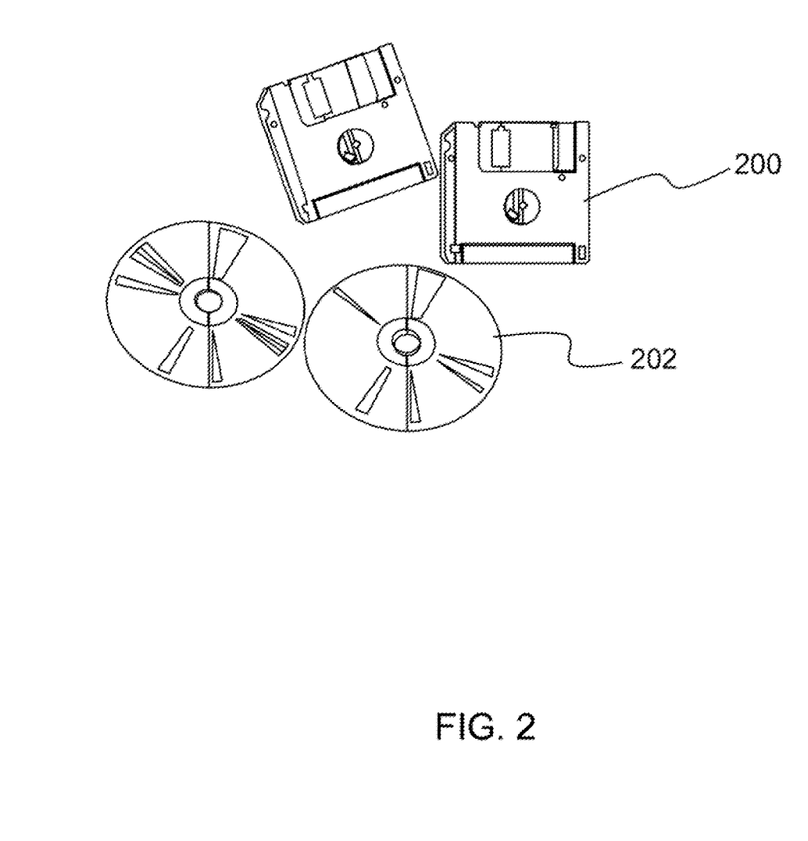
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Layered networks have recently been a subject of great interest in network science with many researchers investigating the interconnectedness and interdependencies of various networks, such as described in Literature Reference Nos. 1, 2, and 6. For instance, consider transportation networks in which locations are represented by nodes, and edges represent different modes of transportation between these locations. Another example is the interdependency between power and communication networks. A power failure may result in communication failure, which then may result in further power failures as technicians are unable to communicate, as described in Literature Reference No. 5. In social networks, a similar effect may occur with viral spreading. In general, an event in one network may have wide-reaching consequences in other networks, and so it is crucial to understand how relevant networks affect one another if one wishes to track the flow of activity across networks or make future predictions based on events in a single network. Thus, the system according to the principles of the present invention solves this need by aligning user accounts across online social media platforms to track activity which flows across the social media platforms. Further details are provided below.

(4) SPECIFIC DETAILS OF THE INVENTION (4.1) Linking Method

Some users who possess both WordPress™ and Twitter™ accounts utilize a feature of WordPress™ to link their accounts together. In this case, any blog post the user makes will automatically generate a Tweet™ containing a link to the blog post on Twitter™. Crucially, the shortened uniform resource locator (URL) used in this automatic tweet is unique and of the form http://wp.me followed by an alphanumeric identifier. For convenience, such a Tweet™ is referred to as a "linking Tweet™." Due to the uniqueness of the shortened URL, this is an accurate way to associate a Twitter™ account to a WordPress™ blog. Similarly, Tumblr™ users may link to their Twitter™ accounts, in which case a Tweet™ is automatically generated for each Tumblr™ post which has the form http://tmblr.co/ followed by an alphanumeric identifier.

However, in either case it is possible that another Twitter™ user copied the link from the original Tweet™ and pasted it into a new Tweet™, so this method may fail. It is especially problematic in the case that the user only made a single blog post which was then tweeted by other users. The first such Tweet™ must necessarily correspond to the correct user, but to find the first Tweet™ containing the URL it would be necessary to have 100% of the Tweets™ from that day. The Twitter™ data was purchased through Gnip, Inc., which is a social media application programming interface (API) aggregation company headquartered in Boulder, Colo. Gnip, Inc. provides data from dozens of social media websites via one API. Obtaining 100% of the Twitter™ data is very costly; thus, most research studies, such as the one described herein, rely on a 10% random sample (e.g., GNIP Decahose at support.gnip.com/apis/firehose/overview). Since only 10% of the Twitter™ data is obtained, it is, in general, impossible to find the original Tweet™. In order to maximize the accuracy, the system associates the WordPress™ blog or Tumblr™ account to the Twitter™ user with the largest number of linking Tweets™. This identification is referred to as a cross-link.

Figure 3:
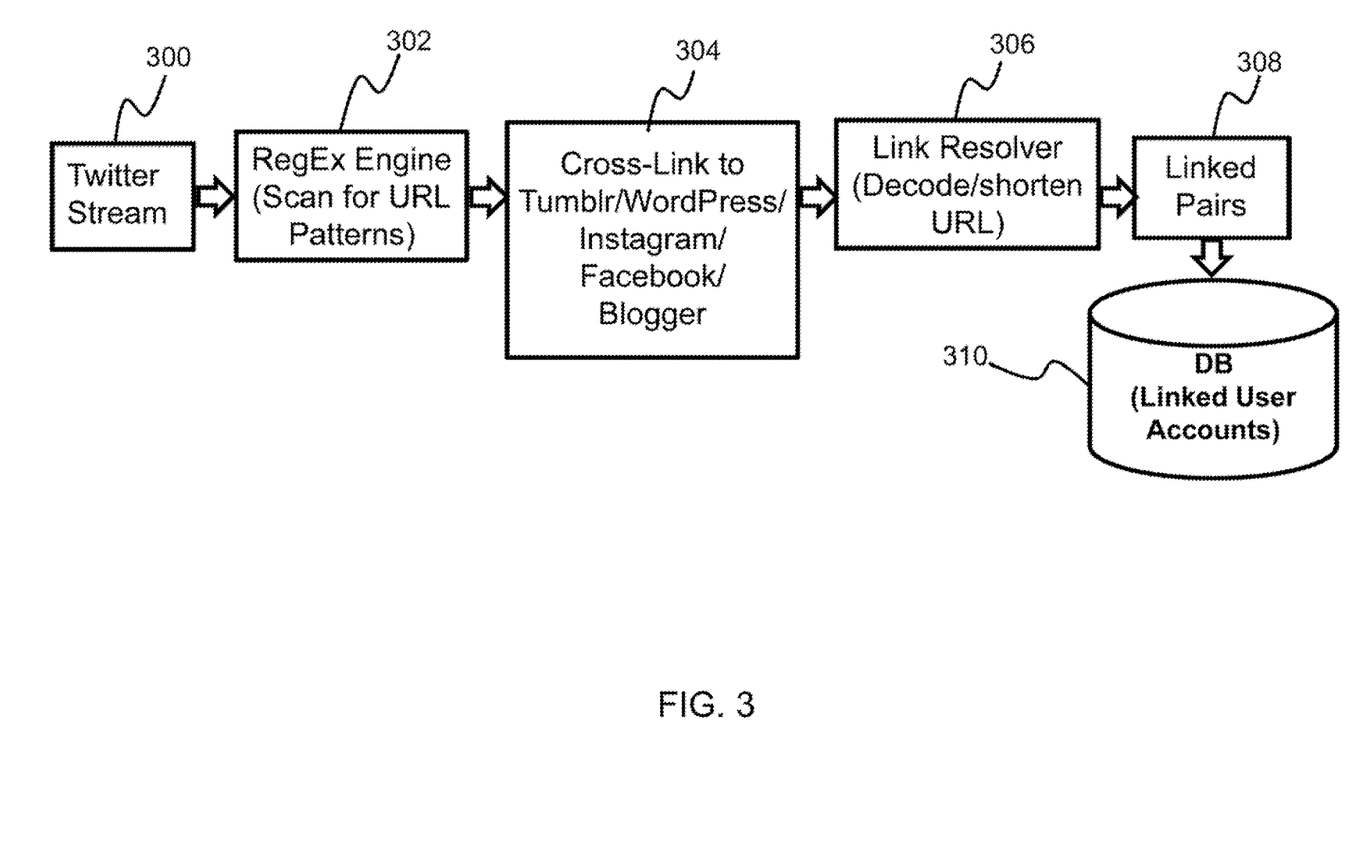
FIG. 3 is an illustration depicting the generation of linking Tweets™ according to the principles of the present invention.

FIG. 3 is a flow chart illustrating the generation of linking Tweets™ according to the principles of the present invention. In a first step 300, the system receives a stream of textual messages from a social media platform (such as a Twitter™ stream or any other platform) as input. "Receiving as input" may occur through one or more processors accessing data stored in memory or receiving data via transmission, such as through a network.

References to Tweets™ and Twitter™ are used as a non-limiting example of textual messages between users of a social media platform. Thus, references to Tweets™ and Twitter™ are used only for illustrative purposes, and the present invention is not intended to be limited thereto. As described above, blog posts in a blogging social media platform, such as WordPress™ or Tumblr™, can automatically generate a Tweet™ containing a link to the blog post. Further, references to WordPress™ or Tumblr™ are used as non-limiting examples of social media platforms. Thus, references to WordPress™ or Tumblr™ are used only for illustrative purposes, and the present invention is not intended to be limited thereto.

In a second step 302, a RegEx (Regular Expression) module identifies Tweets™ containing unique short URLs (i.e., specific character strings), which represent linking Tweets™ (i.e., Tweets™ linked to blog posts). RegEx is described in Literature Reference No. 11. In a third step 304, the system according to the principles of the present invention then infers the linking of social media platform accounts based on the number of linking Tweets™ such that the system associates the WordPress™ blog or Tumblr™ account to the Twitter™ user with the largest number of linking Tweets™, called cross-linking.

In a fourth step 306, a link resolver decodes/shortens the URL. The links returned from the RegEx modules are short form URLs (e.g., tmblr.co/ZSWAms), which are commonly used in Twitter™. This is to ensure that none of the URL encoded in a Tweet™ is beyond 140 characters long. Links from different social platforms have different prefixes. For instance, Tumblr™ has "tmblr.co", and Wordpress™ has "wp.me". The RegEx module essentially searches for Tweets™ with these prefixes. Once a short for URL is obtained, an additional step is needed to resolve it into the full URL indicating the user account (e.g., tumblr.com/michaeljordan). There are various ways to do this; in the present invention a piece of code was written to resolve it via http connection.

In a fifth step 308, linked pairs (i.e., linked user accounts) are outputted and stored in a database (DB) 310. Non-limiting examples of linked pairs include:

Twitter-Tumblr
www.Twitter.com/JordanChicago
www.Tumblr.com/michael.jordan
Twitter-Wordpress
www.Twitter.com/JordanChicago
www.wp.com/michael.j.chicago The linked pairs indicate accounts belonging to the same individuals (users) on different social media platforms. The linked pairs can be represented as a set of corresponding identities that are output as a map component, such as a list or map of corresponding identities that are geo-located, for analysis of social media activity of the user across two or more social media platforms. For instance, a list may comprise a first column representing user identifiers (IDs) on Twitter™, and the second column may represent the corresponding user (IDs) on Tumblr™. The linked pairs may constitute components of a map identifying two or more social media accounts from the same or different social networks that belong to the same user.

The system according to the principles of the present invention searches for (both implicit and explicit) mentions of other social media platform accounts from a stream of textual messages from a social media platform (such as a Twitter™ stream or any other platform). The implicit mention refers to the short URLs (e.g., patterns like "tmblr.co/", "wp.me") as described above. The system is additionally configured to look for explicit mentions of other social media accounts (e.g., patterns like "david.tumblr.com") in the user profile section from each Tweet™.

Figure 4:
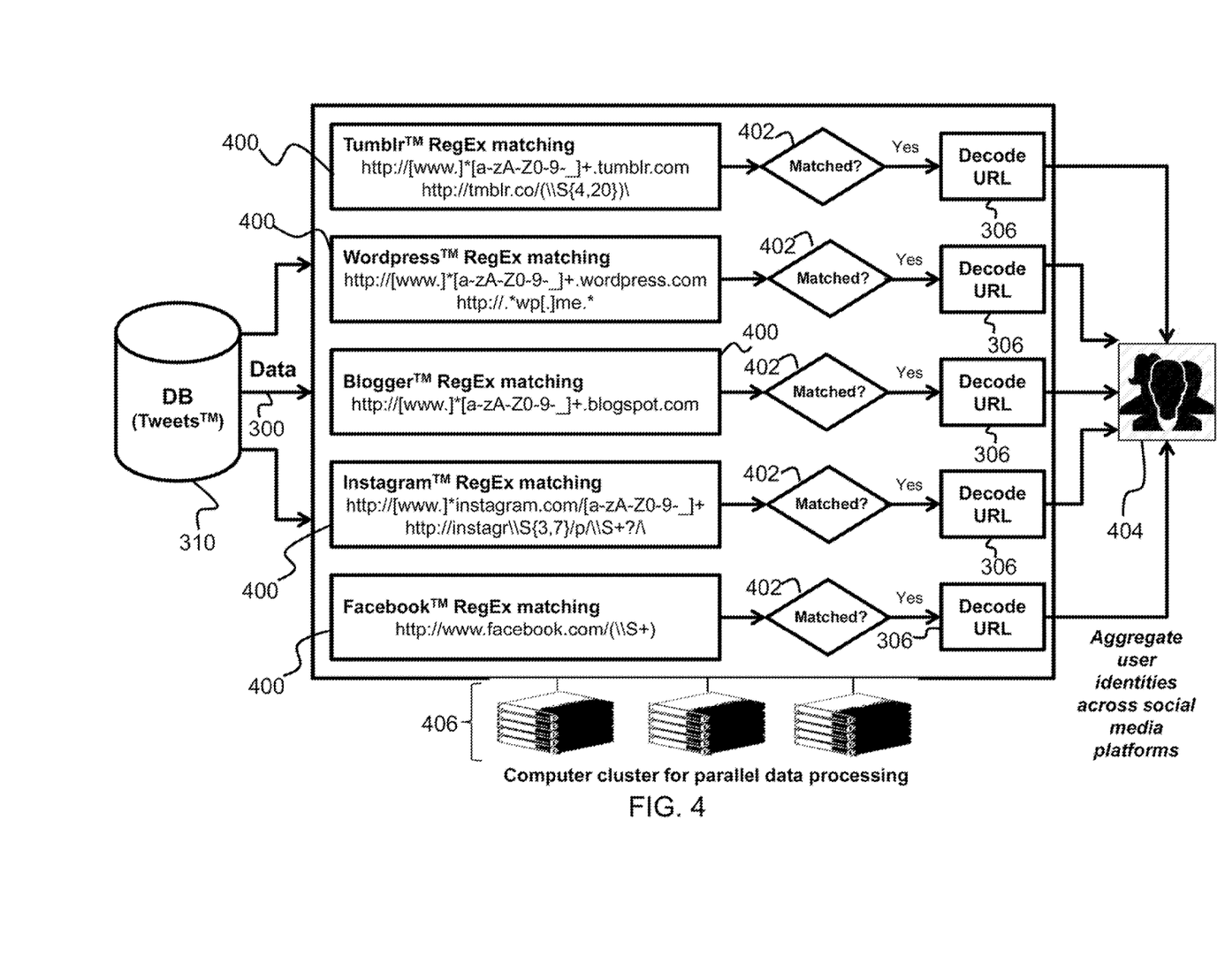
FIG. 4 is an illustration of identifying additional social media accounts associated with the same user according to the principles of the present invention.
Figure 5:
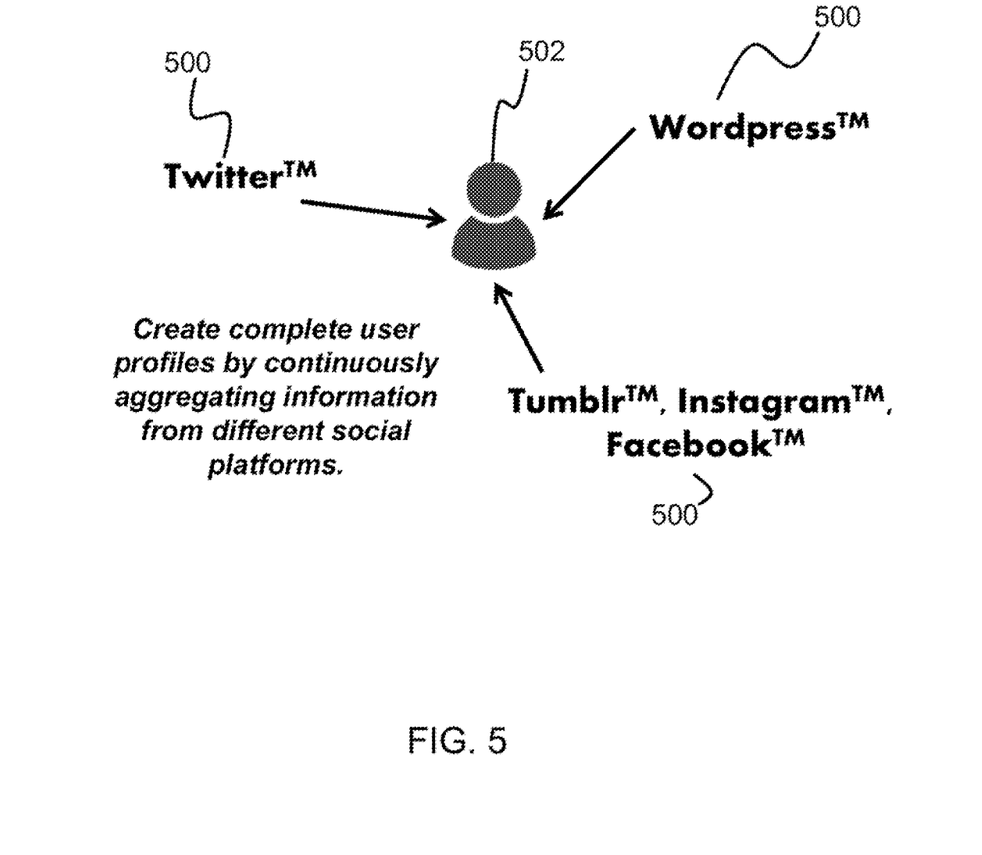
FIG. 5 is an illustration of creation of complete user profiles according to the principles of the present invention.

In some embodiments, as depicted in FIG. 4, additional social media accounts 400 associated with the same user may be identified by performing additional searches using the same set of data (e.g., Twitter posts) 300 from a database 310 (DB) for links or other references corresponding to other social media platforms using RegEx. Cross-verification that the two or more accounts should be linked may be performed by automatically acquiring and confirming a match 402 for one or more of an address, user name, and/or location. In some cases, a close match 402 may be used, such as considering names with similar spellings to be a close match. If a match 402 is confirmed, then the link resolver decodes the URL 306. The system according to the principles of the present invention then aggregates user identities 404 across the social media platforms. In one aspect, the operations described above are performed by a computer cluster for parallel data processing 406. Furthermore, by continuously aggregating information from different social media platforms 500, complete user profiles 502 can be created using the present invention, as shown in FIG. 5

In some embodiments, multiple years of data may be considered. In such cases, a user may use a first Twitter™ (or other social media) account and link posts to a blog (or other social media account). The user may close down or stop using the first Twitter™ account after the first six months, and may start posting using a second Twitter™ account while still linking to the blog during the next six months. During the following six months, the user may start re-using the first Twitter™ account, or may start using another Twitter™ account. The first, second, and third six months may be longer or shorter timeframes, and may be consecutive or may be separated by gaps in time.

In an embodiment, multiple user accounts for the same user in one social media service can be identified by looking at the highest ranked cross-linking poster in different time frames. For example, by picking the accounts with the highest number of cross-links to the same blog for each of the first, second, and third time frames, the same user may be associated with the Twitter™ accounts that linked to the blog in question the most frequently for each of the different time frames.

Figure 6:
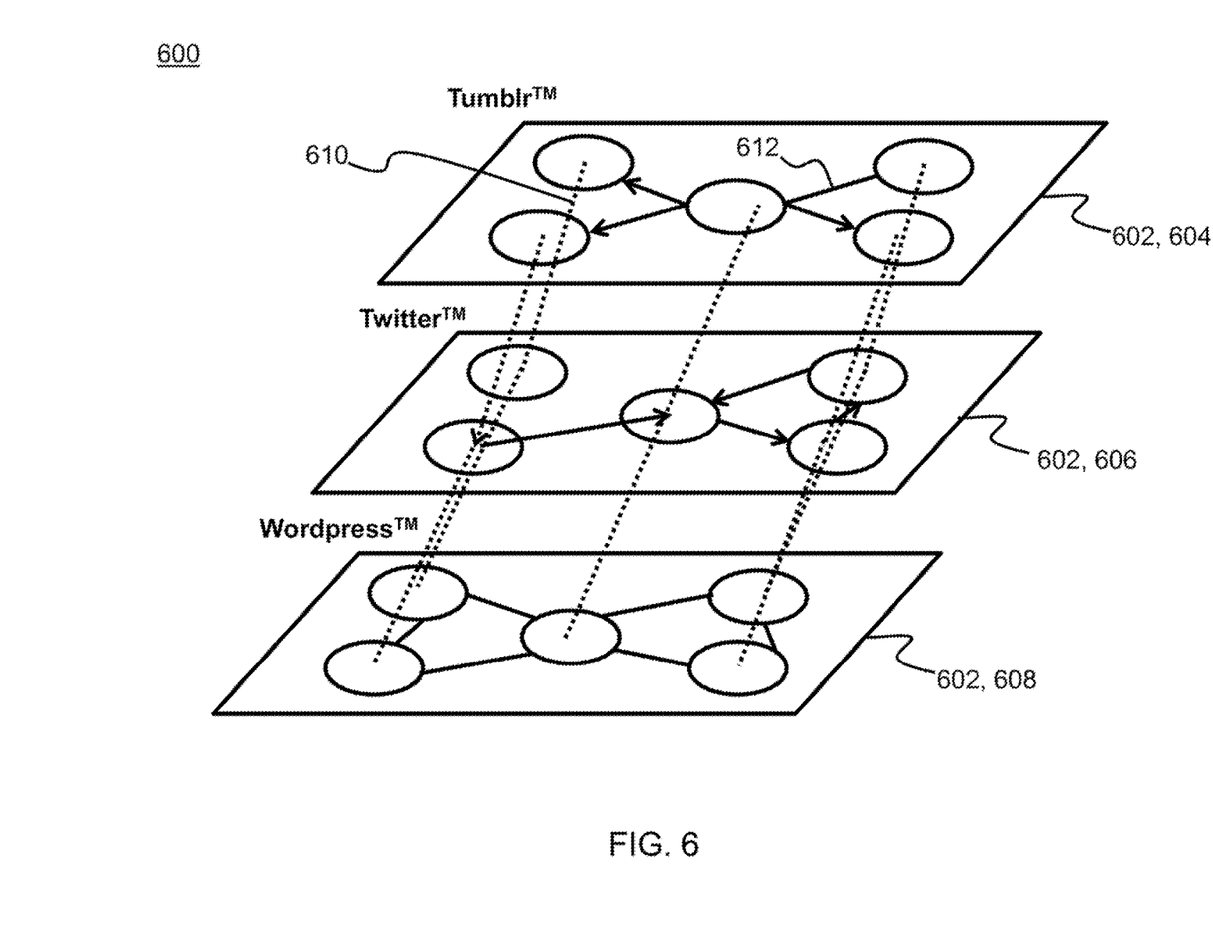
FIG. 6 is an illustration of a layered network according to the principles of the present invention.

FIG. 6 is a diagram illustrating the structure of a layered network 600. Each layer 602 corresponds to a different social network (such as Tumblr™ 604, Twitter™ 606, and WordPress™ 608), where dotted lines 610 indicate users identified across the networks, and solid lines 612 indicate connections internal to each network. The constructed layered network 600 is a non-limiting example of a medium (map component) to analyze information contagion and sentiment spread in the social media context.

Figure 7:
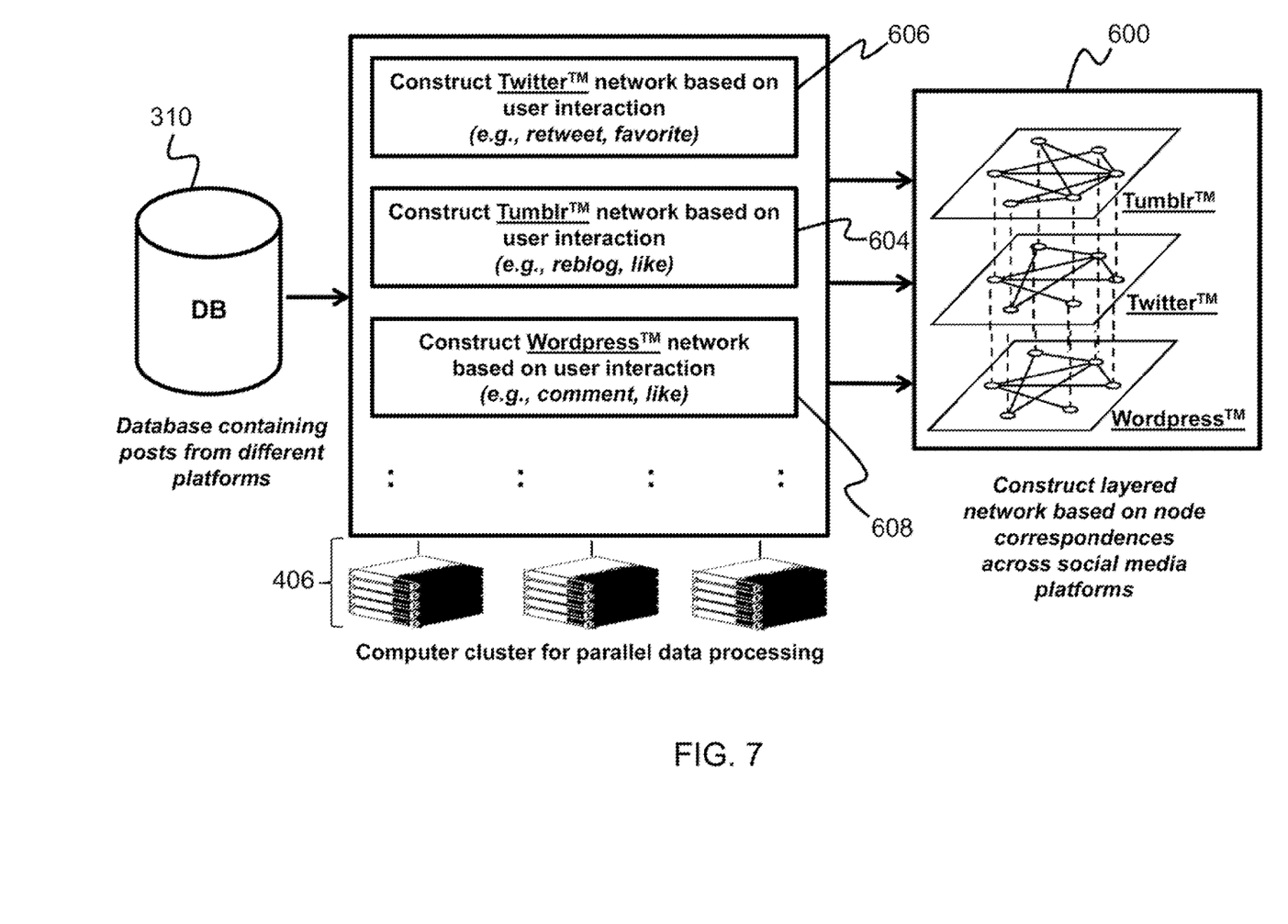
FIG. 7 is an illustration of construction of a layered network according to the principles of the present invention.

FIG. 7 depicts construction of a layered network 600 in detail. From a database 310 containing posts from different social media platforms, a social network for each social media platform (e.g., Tumblr™ 604, Twitter™ 606, and WordPress™ 608) is constructed based on user interaction. The layered network 600 is then constructed based on node correspondences across the social media platforms.

(4.2) Verification

In order to test the accuracy of the method described herein, twenty blogs were sampled at random with at most one linking Tweet™ from each user, with between 1 and 10 linking Tweets™, with between 10 and 100 linking Tweets™, with between 100 and 1000 linking Tweets™, and with over 1000 linking Tweets™. In order to verify the accuracy of these sampled cross-links, the associated accounts were visually inspected. For both the Twitter™-WordPress™ and Twitter™-Tumblr™ sampled cross-links, the twenty samples with only one linking Tweet™ (refer to the "Degree range" columns) showed by far the lowest accuracy, as shown in Tables 1 and 2 below. However, those with more than one linking Tweet™ from at least one user were extremely accurate. Hence, excluding extremely inactive blogs yields an accurate method of cross-linking accounts.

Referring to Tables 1 and 2 below, "Degree range" refers to the number of cross-linking instances detected from the RegEx module. In other words, how many times a short URL (e.g., tmblr.co/ZSW*) was detected from a Twitter™ account. The higher the number, the more confidence there is in the linked pair. "True" denotes that both social media accounts belong to the same user. "False" indicates that the social media accounts do not belong to the same user. "N/A" denotes that one of the social media accounts (or both accounts) has been removed; thus, confirmation of whether the accounts belong to the same user is not possible. "Unsure" indicates that it is uncertain whether the two social media accounts belong to the same user (based on images, name, or other heuristics).

TABLE 1

Twitter ™-Tumblr ™ Cross-Linking

| Degree range | True | False | N/A | Unsure |
|---|---|---|---|---|
| >1000 | 17 | 0 | 2 | 1 |
| >100, <1000 | 17 | 0 | 3 | 0 |
| >10, <100 | 12 | 0 | 8 | 0 |
| >0, <10 | 15 | 0 | 5 | 0 |
| =1 | 7 | 7 | 3 | 3 |
| Overall | 68 | 7 | 21 | 4 |
|  | 90.67% | 9.3% |  |  |

TABLE 2

Twitter ™-WordPress ™ Cross-Linking

| Degree range | True | False | N/A | Unsure |
|---|---|---|---|---|
| >1000 | 18 | 0 | 1 | 1 |
| >100, <1000 | 19 | 0 | 1 | 0 |
| >10, <100 | 16 | 1 | 3 | 0 |
| >1, <10 | 17 | 1 | 2 | 0 |
| =1 | 12 | 6 | 2 | 0 |
| Overall | 82 | 8 | 9 | 1 |
|  | 91.11% | 8.88% |  |  |

Figure 8A:
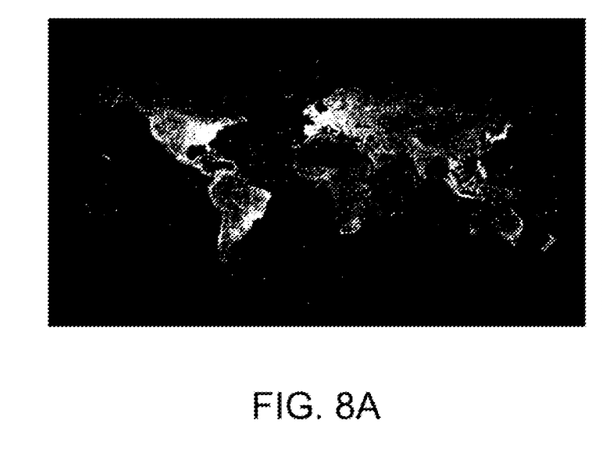
FIG. 8A is an illustration of geo-distribution for linked users of Twitter™ and Tumblr™ according to the principles of the present invention.
Figure 8B:
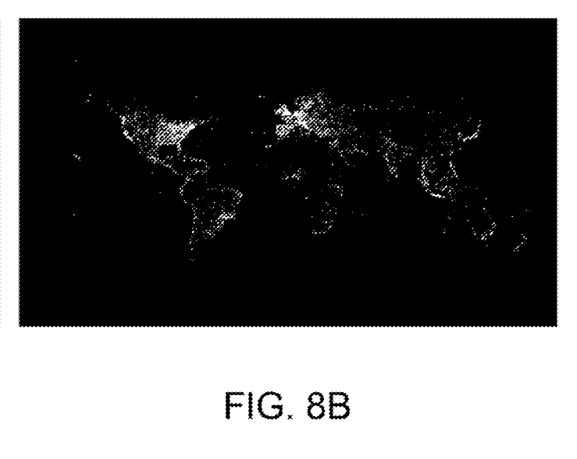
FIG. 8B is an illustration of geo-distribution for linked users of Twitter™ and WordPress™ according to the principles of the present invention.

In addition to quantitative evaluation, geographic distributions of the linked users are showed in FIGS. 8A and 8B. This is done by assigning the geo-information, as described in Literature Reference No. 10, from the linked Twitter™ users to both Tumblr™ users (FIG. 8A) and WordPress™ users (FIG. 8B). Since a real-world event detection from social media is not complete without knowing the geolocation (i.e., where the event is reported from) of the event, assigning geo-information is significant. Linking user accounts enables one to propagate geographic information from one social media platform to another.

Figure 9:
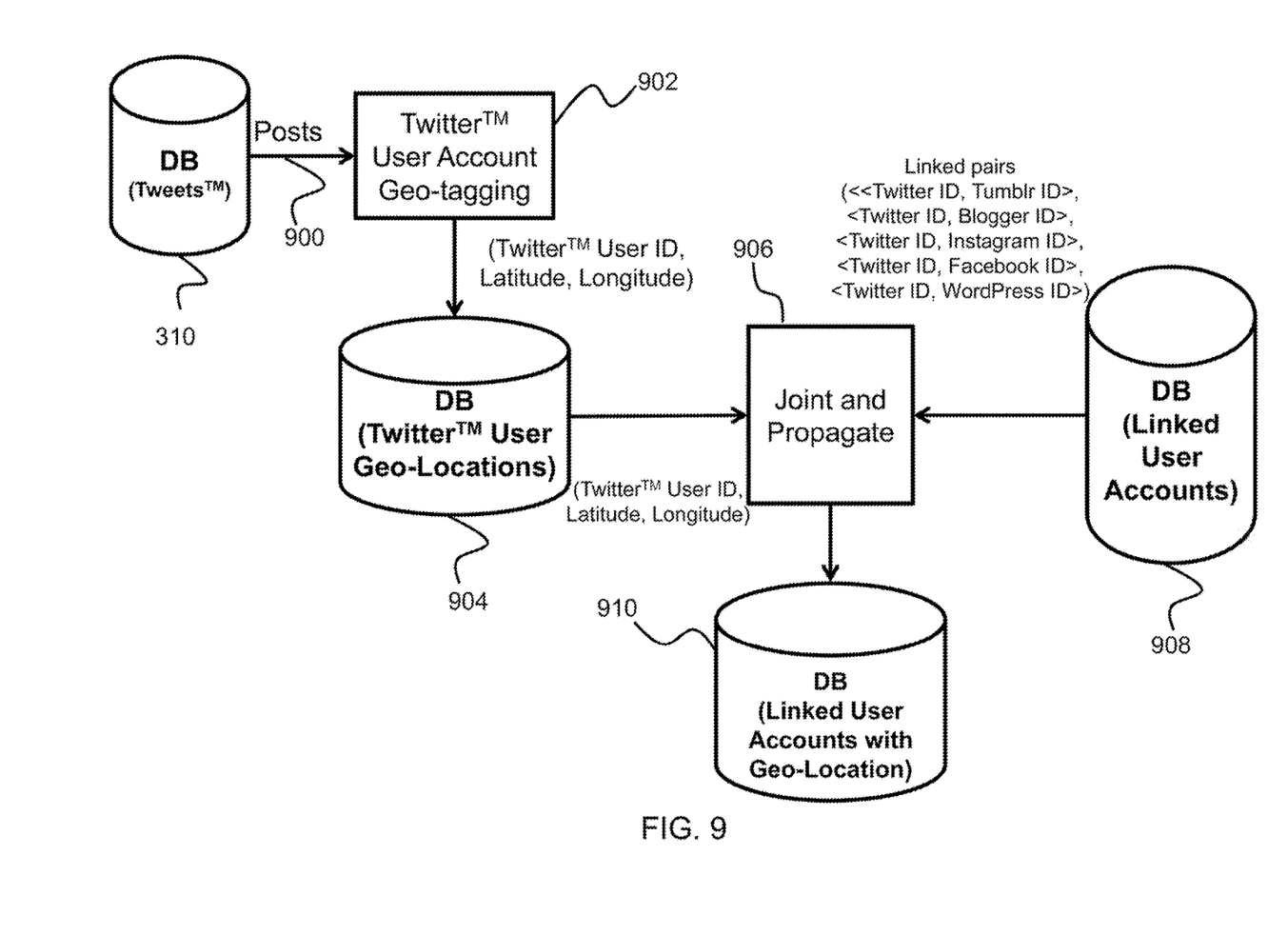
FIG. 9 is an illustration of assigning and storing linked accounts with geo-information according to the principles of the present invention.
Figure 10:
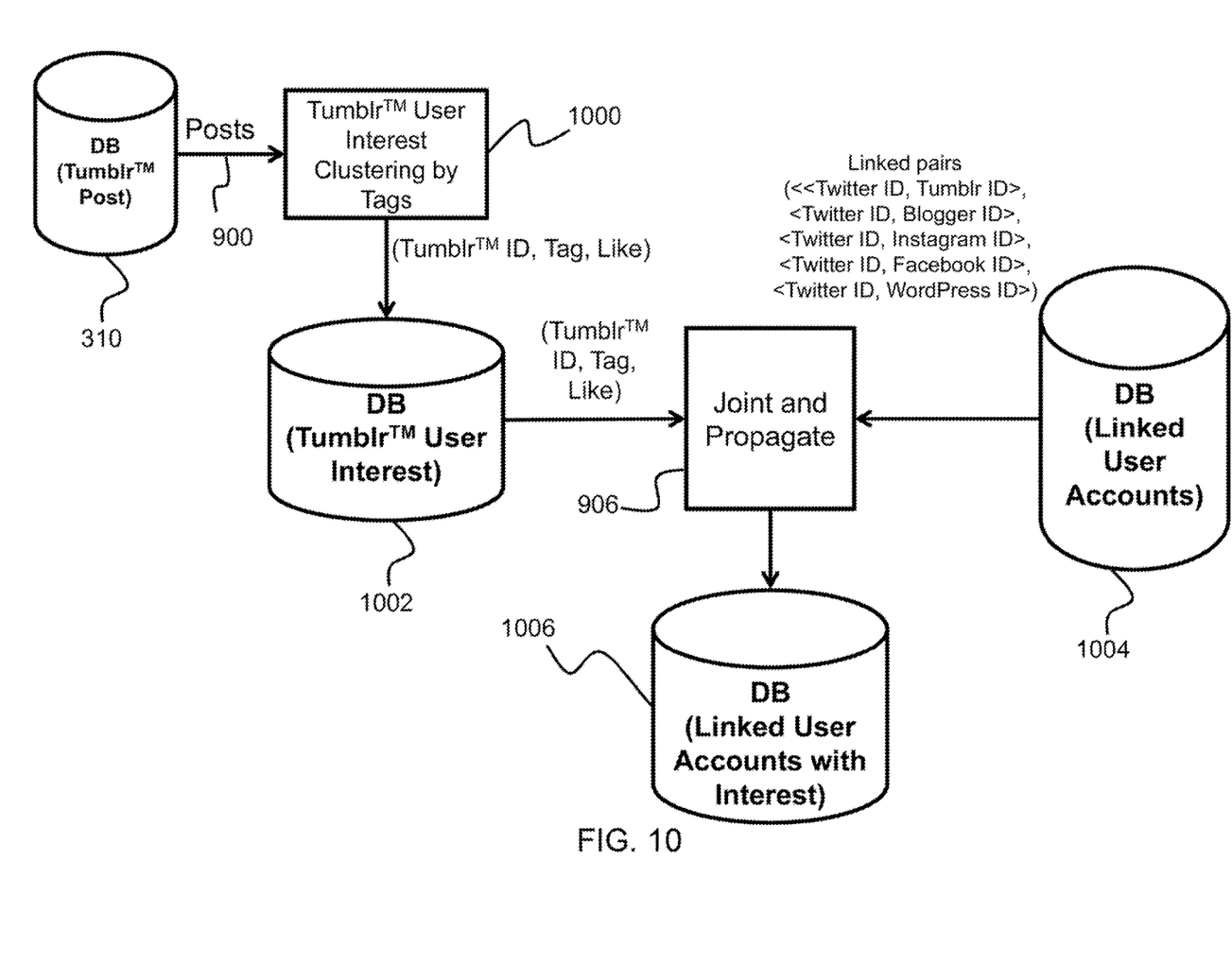
FIG. 10 is an illustration of determining and storing linked accounts with a particular interest according to the principles of the present invention.

FIG. 9 is a flow diagram illustrating a non-limiting example of assigning geo-information to user accounts. Posts 900 (e.g., Tweets™) from a database 310 of Twitter™ data are used to generate geo-tagged user accounts 902. The information from the geo-tagged user accounts 902, such as Twitter™ user ID, latitude, and longitude, is stored in a second database (DB) of user geo-locations 904. User accounts are then linked (joined) as described above, and the linked user accounts are propagated (joint and propagate 906) among the social media platforms. Non-limiting examples of linked accounts/pairs include <Twitter ID, Tumblr ID>, <Twitter ID, Blogger ID>, <Twitter ID, Instagram ID>, <Twitter ID, Facebook ID>, and <Twitter ID, WordPress ID>. The linked user accounts are then stored in a third database 908, and the linked user accounts with geolocation are stored in a fourth database 910. The handling of multiple geo-tags from a variety of different location from the same user and determination of a useful location are described in U.S. application. Ser. No. 14/210,265 and U.S. Provisional Application No. 61/982,747, which are hereby incorporated by reference as though fully set forth herein, FIG. 10 is a flow diagram depicting a non-limiting example of determining and storing linked accounts with a particular interest. Non-limiting examples of user interests include events, consumer products, news articles, images, and websites. In this example, from a posts 900 from a database 310 of Tumblr™ data, user interests are clustered by "topic tags" 1000 (i.e., tags representing topics of user interest). The information from the user interests clustering by tags 1000, such as Tumblr™ ID, topic tags, and likes, is stored in a database of user interests 1002. User accounts are then linked (joined) as described above, and the linked user accounts are propagated (joint and propagate 906) among the social media platforms. The linked user accounts are stored in a third database 1004, and the linked user accounts with interests are stored in a fourth database 1006.

Thus, one can leverage aligned (linked) user accounts to propagate geo-locations (as shown in FIG. 9 and described in U.S. application. Ser. No. 14/210,265 and U.S. Provisional Application No. 61/982,747, which are hereby incorporated by reference as though fully set forth herein, and user interest (as shown in FIG. 10) from one social media platform to others. For example, one can use such information to predict where a civil unrest will happen (i.e., location) and who will participate (interested in protest), as described in U.S. application Ser. No. 14/295,101 entitled, "Social Media Data Mining for Early Detection of Newsworthy Civil Unrest Events," which is hereby incorporated by reference as though fully set forth herein. Additionally, targeted advertising and other location and interest related recommendation systems are other potential applications.

(4.3) Instigators

Users who are especially active and influential users are referred to as "instigators." The behavior of instigators across social media platforms may be interesting, and the method of cross-linking makes it possible to observe this behavior. As a first step, some preliminary analysis has been completed. The cross-linked users were compared to a list of 47,684 Twitter™ users who had been identified as "instigators" of civil unrest events. Of the 1,664,007 Twitter™-Tumblr™ cross-links, 1445 were also on the list of instigators. Of the 795,000 Twitter™-WordPress™ cross-links, 646 were also on the list of instigators. It was also noted that instigators seemed to have a tendency to change account names, with 111 of the Tumblr™ instigators having multiple Tumblr™ accounts and 116 WordPress™ users having multiple blogs.

The system according to the principles of the present invention has applications in both government and commercial domains. For example, the invention described herein can be used by a government agency to more accurately predict civil unrest events. Furthermore, the present invention could be used to track the spread of opinions and sentiments for product marketing strategy. Additionally, the system can create a unified people search facility which can search for individuals across a number of social media platforms and produce consolidated results by removing duplicate contents and summarizing user profiles. Moreover, the present invention can be utilized to create more effective marketing strategies for individual users based on a better understanding of their interests.

What is claimed is:

1. A computer-implemented method for user alignment across online social media platforms, comprising steps of:
searching a plurality of textual messages from a first social media platform user account for implicit mentions of other social media platform user accounts, wherein an implicit mention comprises a unique shortened uniform resource locator (URL) having a prefix specific to a social media platform, which is followed by an alphanumeric identifier, wherein the unique shortened URL represents a link from the first social media platform to another social media platform;
cross-linking the first social media platform user account with an account of a user on the other social media platform having the largest number of implicit mentions, wherein cross-linked user accounts are user accounts of the first and other social media platforms belonging to the same user;
generating a map component that represents of the cross-linked user accounts aligned across the first social media platform and the other social media platform;
determining at least one of a user interest and geo-information from the aligned user accounts; and
delivering a targeted advertisement or recommendation related to at least one of the user interest and geo-information to one or more of the aligned user accounts, wherein the targeted advertisement or recommendation is accessed by the user via a display device.

2. The method as set forth in claim 1, wherein the one or more processors further perform an operation of assigning the geo-information to the map component.

3. The method as set forth in claim 2, wherein the one or more processors further perform an operation of propagating the geo-information from the first social media platform to the other social media platform.

4. The method as set forth in claim 3, wherein the one or more processors further perform an operation of propagating user interest information from the first social media platform to the other social media platform.

5. A computer program product for user alignment across online social media platforms comprising computer-readable instructions stored on a non-transitory computer-readable medium that are executable by a computer having one or more processors for causing the one or more processors to perform operations of:
searching a plurality of textual messages from first social media platform user account for implicit mentions of other social media platform user accounts, wherein an implicit mention comprises a unique shortened uniform resource locator (URL) having a prefix specific to a social media platform, which is followed by an alphanumeric identifier, wherein the unique shortened URL represents a link from the first social media platform to another social media platform;

cross-linking the first social media platform user account with an account of a user on the other social media platform having the largest number of implicit mentions, wherein cross-linked user accounts are user accounts of the first and other social media platforms belonging to the same user;

generating a map component that represents the cross-linked user accounts aligned across the first social media platform and the other social media platform;

determining at least one of a user interest and geo-information from the aligned user accounts; and delivering a targeted advertisement or recommendation related to at least one of the user interest and geo-information to one or more of the aligned user accounts, wherein the targeted advertisement or recommendation is accessed by the user via a display device.

6. The computer program product as set forth in claim 5, further comprising instructions for causing the processor to perform an operation of assigning the geo-information to the map component.

7. The computer program product as set forth in claim 6, further comprising instructions for causing the one or more processors to perform an operation of propagating the geo-information from the first social media platform to the other social media platform.

8. The computer program product as set forth in claim 7, further comprising instructions for causing the one or more processors to perform an operation of propagating user interest information from the first social media platform to the other social media platform.

9. A system for user alignment across online social media platforms, the system comprising:

one or more processors and a non-transitory computer-readable medium having executable instructions encoded therein such that when executed, the one or more processors perform operations of:

searching a plurality of textual messages from a first social media platform user account for implicit mentions of other social media platform user accounts, wherein an implicit mention comprises a unique shortened uniform resource locator (URL) having a prefix specific to a social media platform, which is followed by an alphanumeric identifier, wherein the unique shortened URL represents a link from the first social media platform to another social media platform;

cross-linking the first social media platform user account with an account of a user on the other social media platform having the largest number of implicit mentions, wherein cross-linked user accounts are user accounts of the first and other social media platforms belonging to the same user;

generating a map component that represents of the cross-linked user accounts aligned across the first social media platform and the other social media platform;

determining at least one of a user interest and geo-information from the aligned user accounts; and delivering a targeted advertisement or recommendation related to at least one of the user interest and geo-information to one or more of the aligned user accounts, wherein the targeted advertisement or recommendation is accessed by the user via a display device.

10. The system as set forth in claim 9, wherein the one or more processors further perform an operation of assigning the geo-information to the map component.

11. The system as set forth in claim 10, wherein the one or more processors further perform an operation of propagating the geo-information from the first social media platform to the other social media platform.

12. The system as set forth in claim 11, wherein the one or more processors further perform an operation of propagating user interest information from the first social media platform to the other social media platform.

13. The system as set forth in claim 9, wherein the one or more processors further perform an operation of using the map component, generating geographic distributions of the associated user accounts for real-world event detection.

14. The system as set forth in claim 9, wherein the targeted advertisement is based, in part, on geo-information of the map component.

15. The system as set forth in claim 9, wherein the unique shortened URL is automatically generated by the other social media platform when a linked user account of the first social media platform makes a post.

16. The system as set forth in claim 15, wherein the first social media platform is Wordpress, and the other social media platform is Twitter.

* * * * *